US010431202B2

(12) United States Patent
Harris et al.

(10) Patent No.: US 10,431,202 B2
(45) Date of Patent: Oct. 1, 2019

(54) SIMULTANEOUS DIALOGUE STATE MANAGEMENT USING FRAME TRACKING

(71) Applicant: Microsoft Technology Licensing, LLC, Redmond, WA (US)

(72) Inventors: Justin Harris, Montreal (CA); Layla El Asri, Montreal (CA); Emery Fine, Montreal (CA); Rahul Mehrotra, Montreal (CA); Hannes Schulz, Karlsruhe (DE); Shikhar Sharma, Montreal (CA); Jeremie Zumer, Montreal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/628,421

(22) Filed: Jun. 20, 2017

(65) Prior Publication Data

US 2018/0226066 A1   Aug. 9, 2018

Related U.S. Application Data

(60) Provisional application No. 62/455,144, filed on Feb. 6, 2017, provisional application No. 62/411,050, filed
(Continued)

(51) Int. Cl.
*G10L 15/02* (2006.01)
*G06F 17/27* (2006.01)
(Continued)

(52) U.S. Cl.
CPC ........ *G10L 15/02* (2013.01); *G06F 16/90332* (2019.01); *G06F 17/279* (2013.01); *G06F 17/2765* (2013.01); *G06N 5/027* (2013.01)

(58) Field of Classification Search
CPC ..... G10L 15/20; G10L 15/22; G10L 21/0208; G06F 17/2872; G06F 17/2785; G06F 3/016; H04K 999/99
See application file for complete search history.

(56) References Cited

U.S. PATENT DOCUMENTS 7,664,644 B1 * 2/2010 Tur ...................... G10L 15/1822
704/257
8,577,671 B1 * 11/2013 Barve ............... G06F 17/30522
704/9
(Continued)

OTHER PUBLICATIONS

Asri, et al., "Frames: A Corpus for Adding Memory to Goal-Oriented Dialogue Systems", https://static1.squarespace.com/static/58177ecc1b631bded320b56e/t/585ab3b0e3df288638cbd331/1482339250251/Maluuba+Frames+Paper.pdf, Retrieved on: Feb. 8, 2017, 1-17 pages.
(Continued)

*Primary Examiner* — Anne L Thomas-Homescu

(57) ABSTRACT

Examples of the present disclosure describe systems and methods relating to conversation state management using frame tracking. In an example, a frame may represent one or more constraints (e.g., parameters, variables, or other information) received from or generated as a result of interactions with a user. Consequently, each frame may represent one or more states of an ongoing conversation. When the user provides new or different information, a new frame may be created to represent the now-current state of the conversation. The previous frame may be retained for later access by what is referred to herein as a "dialog agent," which is the portion of the system that can search and use previous state-related information. When an utterance is received, a frame to which the utterance relates may be identified. Thus,
(Continued)

the dialog agent may track multiple states simultaneously, thereby enabling conversation features that were not previously possible.

20 Claims, 9 Drawing Sheets

Related U.S. Application Data on Oct. 21, 2016, provisional application No. 62/426,856, filed on Nov. 28, 2016, provisional application No. 62/437,521, filed on Dec. 21, 2016.

(51) Int. Cl.
*G06F 16/9032* (2019.01)
*G06N 5/02* (2006.01)

(56) References Cited

U.S. PATENT DOCUMENTS

| | | | | |
|---|---|---|---|---|
| 9,466,297 | B2* | 10/2016 | Crook | G10L 15/183 |
| 2001/0049688 | A1* | 12/2001 | Fratkina | G06F 17/30654 |
| 2003/0033146 | A1* | 2/2003 | Morin | G10L 15/065 |
| | | | | 704/251 |
| 2004/0085162 | A1* | 5/2004 | Agarwal | G10L 15/22 |
| | | | | 333/196 |
| 2006/0009973 | A1* | 1/2006 | Nguyen | H04M 3/4936 |
| | | | | 704/257 |
| 2006/0150122 | A1* | 7/2006 | Hintermeister | G06F 9/451 |
| | | | | 715/833 |
| 2007/0015121 | A1* | 1/2007 | Johnson | G09B 7/02 |
| | | | | 434/156 |
| 2007/0094185 | A1* | 4/2007 | Ramsey | G06F 17/2785 |
| | | | | 706/45 |
| 2007/0150274 | A1* | 6/2007 | Fujimoto | G10L 15/20 |
| | | | | 704/233 |
| 2008/0091406 | A1* | 4/2008 | Baldwin | G10L 15/22 |
| | | | | 704/4 |
| 2010/0205541 | A1* | 8/2010 | Rapaport | G06Q 10/10 |
| | | | | 715/753 |
| 2011/0258543 | A1* | 10/2011 | Larsson | G06F 3/038 |
| | | | | 715/702 |
| 2012/0173243 | A1* | 7/2012 | Anand | H04M 3/4936 |
| | | | | 704/270.1 |
| 2014/0136212 | A1* | 5/2014 | Kwon | G10L 15/22 |
| | | | | 704/275 |
| 2014/0172419 | A1* | 6/2014 | John | H04M 3/56 |
| | | | | 704/201 |
| 2014/0188477 | A1* | 7/2014 | Zhang | G10L 15/22 |
| | | | | 704/257 |
| 2014/0188478 | A1* | 7/2014 | Zhang | G10L 15/22 |
| | | | | 704/257 |
| 2014/0309993 | A1* | 10/2014 | Goussard | G10L 15/063 |
| | | | | 704/231 |
| 2014/0316764 | A1* | 10/2014 | Ayan | G10L 15/24 |
| | | | | 704/9 |
| 2015/0032443 | A1* | 1/2015 | Karov | G06F 17/2785 |
| | | | | 704/9 |
| 2015/0310855 | A1* | 10/2015 | Bak | G10L 15/22 |
| | | | | 704/249 |
| 2016/0055859 | A1* | 2/2016 | Finlow-Bates | G10L 21/0202 |
| | | | | 704/225 |
| 2016/0070696 | A1* | 3/2016 | Lavallee | G10L 15/00 |
| | | | | 704/9 |
| 2017/0286971 | A1* | 10/2017 | Husted Andersen | G06Q 30/01 |
| 2017/0330556 | A1* | 11/2017 | Fatemi Booshehri | G10L 15/063 |
| 2018/0068656 | A1* | 3/2018 | Lehman | G10L 15/1815 |
| 2018/0075847 | A1* | 3/2018 | Lee | G10L 15/22 |

OTHER PUBLICATIONS

Lowe, et al., "The Ubuntu Dialogue Corpus: A Large Dataset for Research in Unstructured Multi-Turn Dialogue Systems", In Proceedings of Computing Research Repository, Jun. 2015, 10 pages.

Li, et al., "The MSIIP System for Dialog State Tracking Challenge 4", In Publication of Springer, Feb. 8, 2017, pp. 1-11.

Asoh, et al., "A Spoken Dialog System for a Mobile Office Robot", In Proceedings of Conference: Sixth European Conference on Speech Communication and Technology, Sep. 5, 1999, 17 pages.

Kim, et al., "The Fifth Dialog State Tracking Challenge", In Proceedings IEEE Spoken Language Technologies Workshop, Dec. 13, 2016, 7 pages.

Zhao, et al., "Towards End-to-End Learning for Dialog State Tracking and Management using Deep Reinforcement Learning", In Proceedings of Computing Research Repository, Jun. 2016, 10 pages.

Henderson, Matthew, "Machine Learning for Dialog State Tracking: A Review", In Proceedings of the First International Workshop on Machine Learning in Spoken Language Processing, Sep. 19, 2015, 8 pages.

Woudenberg, A.F. Van, "A Chatbot Dialogue Manager Chatbots and Dialogue Systems: A Hybrid Approach", In Master's Thesis, Jun. 17, 2014, 132 pages.

Wang, et al., "Recent Advances on Human-Computer Dialogue", In Proceedings of CAAI Transactions on Intelligence Technology, Dec. 23, 2016, pp. 1-10.

* cited by examiner

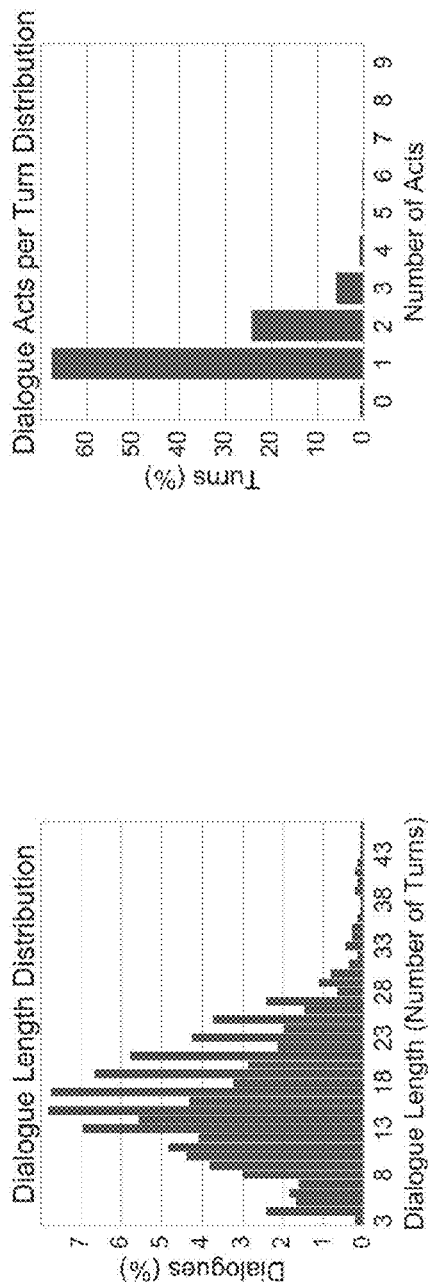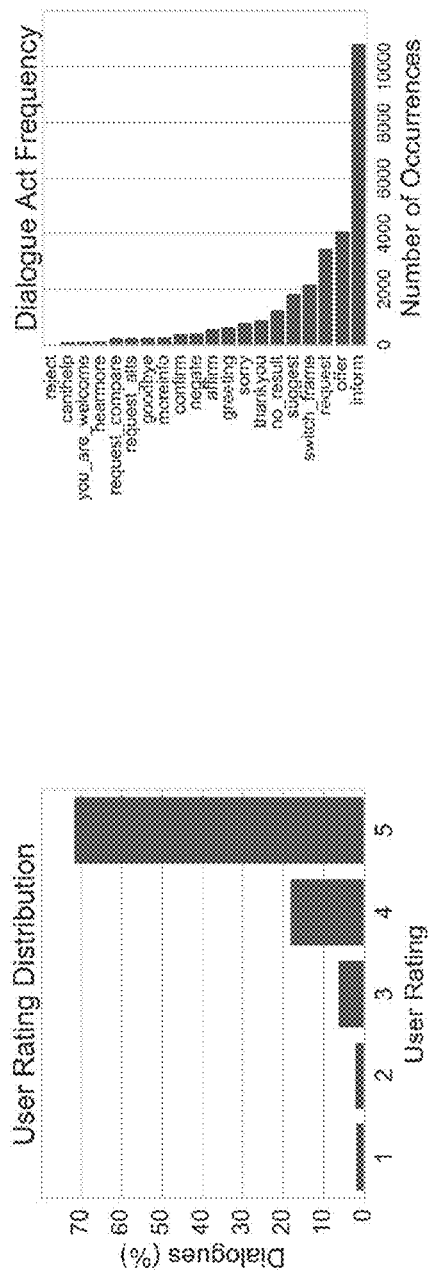
FIG. 1A
FIG. 1B
FIG. 1C
FIG. 1D

SIMULTANEOUS DIALOGUE STATE MANAGEMENT USING FRAME TRACKING

CROSS-REFERENCE TO RELATED APPLICATIONS

This application claims priority to U.S. Provisional Application No. 62/455,144, entitled "Simultaneous Dialogue State Management Using Frame Tracking," filed on Feb. 6, 2017, the entire disclosure of which is hereby incorporated by reference in its entirety. This application further claims priority to U.S. Provisional Application No. 62/411,050, filed on Oct. 21, 2016, U.S. Provisional Application No. 62/426,856, filed on Nov. 28, 2016, and U.S. Provisional Application No. 62/437,521, filed on Dec. 21, 2016.

BACKGROUND

In a dialogue system, state information may be received from a user during a conversation. The state information may be used by the dialogue system when generating a response to user input. However, if the user provides new state information during the conversation, state information that was previously provided by the user may be unavailable to the dialogue system and, as a result, the dialogue system may be unable to generate responses to user input relating to the previously-provided state information.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to simultaneous dialogue or conversation state management using frame tracking. In an example, frames may be created based on portions of a conversation and and/or other inputs. A frame may represent one or more constraints (e.g., parameters, variables, or other information) received from or generated as a result of interactions with a user. Consequently, each frame may represent one or more states of the ongoing conversation. As an example, a frame may store information relating to one or more states (e.g., information received from the user, intermediate information generated based on information received from the user, etc.), or relating to the conversation as a whole, among other information. When the user provides new or different information, a new frame may be created to represent the now-current state of the conversation. The previous frame may be retained for later access by what is referred to herein as a "dialogue agent", which is the portion of the system that can search and use previous state-related information.

When an utterance is received from a user, the utterance may be evaluated to determine a slot (e.g., which parameter is being referred to by the user, what type of information the user is providing, etc.) and a value (e.g., a constraint or parameter, among others). In addition to determining the slot and value information, a frame to which the utterance relates may be identified or predicted. In an example, it may be determined that the user is referring to a previous frame, in which case a reference may be determined to a previous conversation state and/or a previously-provided value. In another example, it may be determined that the user is not referring to a previous frame, but is instead advancing the conversation. As a result, the dialogue agent may converse with the user while tracking multiple states simultaneously, thereby enabling conversation features that were not previously possible (e.g., comparing between states, retrieving old information, providing reminders, etc.).

Aspects of the present disclosure are discussed in greater detail with respect to an example Frames corpus. The Frames corpus was generated in a Wizard-of-Oz setting, wherein users engaged in dialogue with human wizards that assumed the role of a dialogue system. Users and wizards conversed in dialogue turns, wherein a dialogue turn may be a dialogue message from either a user or a wizard. Dialogue turns within the corpus may be annotated with a variety of dialogue acts, such that the dialogue turns may be categorized and further analyzed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1A illustrates an overview of an example distribution of dialogue length in the Frames corpus.

FIG. 1B illustrates an overview of an example of the number of acts per dialogue turn.

FIG. 1C illustrates an overview of an example distribution of user ratings.

FIG. 1D illustrates an overview of an example of the occurrences of dialogue acts in the Frames corpus.

DETAILED DESCRIPTION

Figure 2:
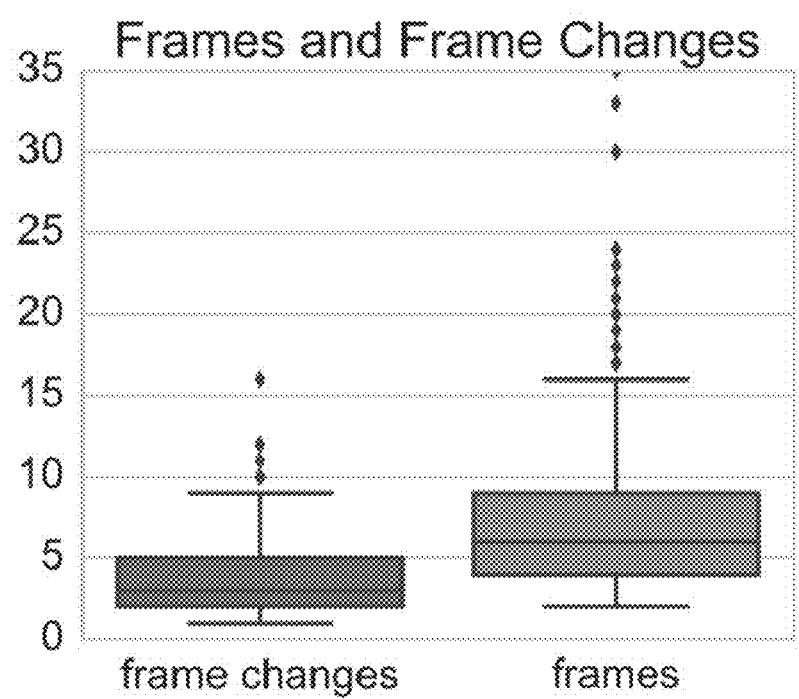
FIG. 2 illustrates an overview of example boxplots for the number of frame creations and the number of frame changes in the Frames corpus.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Previous goal-oriented, information-retrieving dialogue systems have traditionally been designed to help users find items in a database given a certain set of constraints. For instance, the LET'S GO dialogue system finds a bus schedule given a bus number and a location. As those skilled in the art will appreciate, the bus-related dialogue system is considered to operate in the "bus domain," in that responses are generally limited to bus-related responses.

These systems model dialogue as a sequential process: the system requests constraints until it can query the database and return one or more results to a user or application. For ease of disclosure, the aspects disclosed herein will be described as a system or method interacting with a user. Alternatively, the systems and methods disclosed herein may interact with another application or process rather than directly interacting with a user. Then, the user (or another application, etc.) can ask for more information about a given result or ask for other possibilities. If the user wants to know about database items corresponding to a different set of constraints (e.g., another bus line), then these constraints simply overwrite the previous ones. As a consequence, users can neither compare results corresponding to different constraints, nor go back-and-forth between such results.

In the bus domain, users may know exactly what they want. In contrast, user studies in e-commerce have shown that several information-seeking behaviors are exhibited: users may come with a very well-defined item in mind, but they may also visit an e-commerce website with the intent to compare items and explore different possibilities. Supporting this kind of decision-making process in conversational systems implies adding memory. Memory may be used to track different items or preferences set by the user during the dialogue. For instance, consider product comparisons. If a user wants to compare different items using a dialogue system, then a system should be able to separately recall properties pertaining to each item.

This disclosure presents a frames dataset, which comprises a corpus of dialogues where memory is used to understand their structure. A sample frames dataset comprises 1369 human-human dialogues that were collected in a Wizard-of-Oz (WOz) setting—i.e., users were paired up with humans (the "wizards") who were assuming the role of the dialogue system. The wizards had access to a database of vacation packages containing round-trip flights and a hotel. The users were asked to find packages based on a few constraints such as a destination and a budget. As will be appreciated, while the instant disclosure uses an example dialogue relating to one or more vacation packages, any other topic or domain may be analyzed or processed according to aspects disclosed herein without departing from the spirit of this disclosure.

In order to test the memory capabilities of a conversational agent, a new task called frame tracking may be performed. In frame tracking, a conversational agent may simultaneously track multiple semantic frames (queries or sets of items matching a query) throughout the dialogue. For example, two frames may be constructed and recalled while comparing two products—each containing the properties of a specific item. Frame tracking may be an extension of a state tracking task. In state tracking, information summarizing a dialogue history may be compressed into one semantic frame. In contrast, several frames may be kept in memory during frame tracking, such that each frame may correspond to a particular context, e.g., one or more vacation packages in this example. The Frames dataset is discussed below in greater detail, as well as a discussion of aspects relating to the frame tracking task and a discussion of a baseline model that may be used to perform frame tracking.

In Wizard-of-Oz (WOz) data collection, one participant (the wizard) plays the role of the dialogue system. The wizard has access to a search interface connected to a database. In an example, the wizard may receive the user's input and decide what to say next.

WOz dialogues may have the considerable advantage of exhibiting realistic behaviors that cannot be supported by current (end-to-end or not) architectures. Since there is no dialogue system that incorporates the type of memory that was the focus of this dataset, human-human dialogues were examined instead. Unlike the usual WOz setting, users did not think they were interacting with a dialogue system but instead knew that they were talking to a human-being. Templated answers were not given to the wizards, so as to study information presentation and dialogue management in addition to memory. The use of text-based dialogues may allow more controlled wizard behavior, may obviate handling time-sensitive turn-taking and speech recognition noise, and may allow studying more complex dialogue flows. As will be appreciated, other formulations of the WOz setting may be implemented without departing from the spirit of this disclosure, for example where users believe they are communicating with something other than a human-being, where the wizards have templated answers, or where the dialog occurs using a medium other than textual chat, among others.

In an example, dialogues may be performed using a conversational or collaboration platform, such as MICROSOFT TEAMS or SLACK by SLACK TECHNOLOGIES. A chat bot named "wozbot" was deployed and used to pair up participants and record conversations. The participants in the user role indicated when they were available for a new dialogue through this bot. They were then assigned to an available wizard and received a new task. The tasks were built from templates such as the following:

"Find a vacation between [START_DATE] and [END_DATE] for [NUM_ADULTS] adults and [NUM_CHILDREN] kids. You leave from [ORIGIN_CITY]. You are travelling on a budget and you would like to spend at most $[BUDGET]."

Each template had a probability of success. The tasks were generated by drawing values (e.g., BUDGET) from the database. The generated tasks were then added to a pool. The constraint values were drawn in order to comply with the template's probability of success. For example, if 20 tasks were generated at probability 0.5, about 10 tasks would be generated with successful database queries and the other 10 would be generated so the database returned no results for the constraints. This mechanism may be used to emulate cases when a user would not find anything meeting her constraints. If a task was unsuccessful, the user either ended the dialogue or got an alternate task such as:

"If nothing matches your constraints, try increasing your budget by $200."

Thirty-eight templates were created. Fourteen templates were generic such as the one presented above and the other 24 were written to encourage more role-playing from users and to keep them engaged. It will be appreciated that while specific numeric examples are provided herein as examples, other quantities or proportions may be used.

To control data collection, a set of instructions were given to the participants. The user instructions encouraged a variety of behaviors. As for the wizards, they were asked to only talk about the database results and the task-at-hand. This is necessary if one wants to build a dialogue system that emulates the wizards' behavior in this corpus. The wizards were also asked to sometimes act badly. It is interesting from a dialogue management point of view to have examples of bad behavior and of how it impacts user satisfaction. At the end of each dialogue, the user was asked to provide a wizard cooperativity rating on a scale of 1 to 5. The wizard, on the other hand, was shown the user's task and was asked whether she thought the user had accomplished it.

Wizards received a link to a search interface every time a user was connected to them. The search interface was a simple GUI with all the searchable fields in the database. For every search in the database, up to 10 results were displayed. These results were sorted by increasing price. A wizard may perform other tasks in addition to or in alternative to searching a database using a GUI, including, but not limited to retrieving information from other information sources (e.g., a local or remote data store, another application, etc.) or performing analysis or computations, among others.

Another property of human dialogue that was studied with the Frames dataset was how to provide the user with information on the database. When a set of user constraints leads to no results, users may benefit from knowing that relaxing a given constraint (e.g., increasing the budget by a reasonable amount) may lead to results instead of navigating the database blindly. This was modelled by displaying suggestions to the wizards when a database query returned no results. Suggestions were packages obtained by randomly relaxing one or more constraints. It was up to the wizard to decide whether or not to use suggestions.

The data collection process described above was used to collect 1369 dialogues. FIG. 1A illustrates an overview of an example distribution of dialogue length in the Frames corpus. The average number of turns is 15, for a total of 19986 turns in the dataset. A turn may be defined as a dialog message sent by either a user or a wizard. In an example, a user turn may be followed by a wizard turn and vice versa. In other examples, multiple turns may be performed by a user or a wizard before the other party performs a turn.

FIG. 1B illustrates an overview of an example of the number of acts per dialogue turn. About 25% of the dialogue turns have more than one dialogue act. The turns with 0 dialogue acts are turns where the user asked for something that the wizard could not provide, e.g., because it was not part of the database. Such user turns were left unannotated and are usually followed up by the wizard saying she cannot provide the required information.

FIG. 1C illustrates an overview of an example distribution of user ratings. More than 70% of the dialogues have the maximum rating of 5. FIG. 1D illustrates an overview of an example of the occurrences of dialogue acts in the Frames corpus. The dialogue acts are described in Table 7. The annotation scheme is discussed in greater detail below.

Returning to the Frames dataset, the dataset was annotated with three types of labels:

1. Dialogue acts, slot types, slot values, and references to other frames for each utterance.
2. The ID of the currently active frame.
3. Frame labels which were automatically computed based on the previous two sets of labels.

While example quantities and types of labels are described above, other labels (e.g., having more or fewer types, different or similar labels, etc.) may be used without departing from the spirit of this disclosure.

Most of the dialogue acts used for annotation are acts that are usually encountered in the goal-oriented setting such as "inform" and "offer." Dialogue acts that are specific to the frame tracking setting were also introduced, such as "switch_frame" and "request_compare." Example dialogue acts are listed in Table 7.

In an example, three sets of slot types may be used as annotations. The first set, listed in Tables 5 and 6, corresponds to the fields of the database. The second set is listed in Table 8 and contains the slot types that were defined to describe specific aspects of the dialogue such as intent, action, and count. The remaining slot types in Table 8 were introduced to describe frames and cross-references between them.

As described herein, a semantic frame may defined by the following parts:
User comparison requests.
User requests.
User binary questions.
Constraints.

In some examples, more, fewer, or different parts may comprise a semantic frame. The first three parts may keep track of user questions. Three types of questions were distinguished. The first type, comparison requests, corresponds to the "request_compare" dialogue act. This dialogue act may be used to annotate turns when a user asks to compare different results, for instance: "Could you tell me which of these resorts offers free wifi?". These questions relate to several frames. The second type of question is user requests, corresponding to the "request" act. These are questions related to one specific frame, for instance "how much will it cost?". Binary questions are questions with slot types and slot values, e.g., "Is this hotel in the downtown area of the city?" ("request" act), or "Is the trip to Marseille cheaper than to Naples?" ("request_compare" act), as well as all confirm acts.

The constraints may be the slots that may have been set to a particular value by the user or the wizard. Any field in the database (see Table 5 and Table 6) may be set by the user or the wizard. For user-created frames, the constraints may be the preferences set by the user (e.g., budget or city). Wizards may create a frame by making an offer or a suggestion. The constraints may then be the properties of the offer or the suggestion.

TABLE 1

Dialogue excerpt with active frame annotation

| Author | Utterance | Frame |
|---|---|---|
| User | I'd like to book a trip to Atlantis from Caprica on Saturday, Aug. 13, 2016 for 8 adults. I have a tight budget of 1700. | 1 |
| Wizard | Hi . . . I checked a few options for you, and unfortunately, we do not currently have any trips that meet this criteria. Would you like to book an alternate travel option? | 1 |
| User | Yes, how about going to Neverland from Caprica on Aug. 13, 2016 for 5 adults. For this trip, my budget would be 1900. | 2 |
| Wizard | I checked the availability for those dates and there were no trips available.Would you like to select some alternate dates? | 2 |

Each dialogue may start at frame 1. New frames may be introduced when the wizard offers or suggests something, or when the user modifies pre-established slots, among other reasons. Frames may be checkpoints in a dialogue, to which the user can return. An example is given in Table 1. In this example, the frame number is changed when the user changes several slot values: the destination city, the number of adults for the trip, and the budget.

Though frames are created for each offer or suggestion made by the wizard, the active frame may only be changed by the user. If the user asks for more information about a specific offer or suggestion, the active frame is changed to the frame introduced with that offer or suggestion. This change of frame is indicated by a "switch_frame" act. Table 2 comprises statistics for an example set of rules used to generate the Frames corpus.

TABLE 2

Frequency of frame creation and switching events

| Rule Type | Author | Rule Description | Relative | Absolute |
|---|---|---|---|---|
| Creation | User | Changing the value of a slot | 31% | 2092 |
|  | Wizard | Making an offer or a suggestion | 69% | 4762 |
| Switching | User | Changing the value of a slot (it may cause the dialogue to switch to that frame) | 50% | 2092 |
|  |  | Considering a wizard offer or suggestion | 39% | 1635 |
|  |  | Switching to an earlier frame by mentioning its slots values | 11% | 458 |

Example slot types for recording the creation and modification of frames were introduced. These slot types are "id", "ref", "read", and "write" (see Table 8). The frame id is defined when the frame is created and is used to switch to this frame when the user decides to do so.

In an example, slot cross-references may be annotated using slot types (e.g., "ref," "read," "write," etc.), as discussed in greater detail below. A reference may comprise the id of the frame it is referring to and the slots and values that are used to refer to that frame (if any). For instance, ref[1{name=Tropic}] means that frame 1 is being referred to by the hotel name Tropic. If anaphora is used to refer to a frame, this may be annotated using the slot "ref_anaphora" (e.g., "This is too long"—inform(duration=too long, ref_anaphora=this)). Inside an "offer" dialogue act, a "ref" may indicate that the frame corresponding to the offer is derived from another frame. This may happen for instance when a wizard proposes a package with business or economy options. Then, the business and economy offers may be derived from the hotel offer.

The slot types "read" and "write" may occur inside a wizard's "inform" act and may be used by the wizards to provide relations between offers or suggestions: "read" may be used to indicate which frame the values are coming from (and which slots are used to refer to this frame, if any), while "write" may indicate the frame where the slot values are to be written (and which slot values are used to refer to this frame, if any). If there is a "read" without a "write," the current frame may be assumed as the storage for the slot values. In some examples, a slot type without a value may indicate that the value is the same as in the referenced frame, but was not mentioned explicitly i.e., "for the same price."

TABLE 3

Annotation example with the write and read slot types

| Author | Utterance | Frame | Annotation |
|---|---|---|---|
| Wizard | I am only able to find hotels with a 2.5 star rating in Punta Cana for that time. | 6 | inform(read=[7{dst_city=Punta Cana, category=2.5}]) |
| User | 2.5 stars will do. Can you offer any additional activities? | 11 | inform(category=2.5) |
| Wizard | Unfortunately I am not able to provide this information. | 11 | sorry, canthelp |
| User | How about breakfast? | 11 | request(breakfast) |
| Wizard | El Mar does not provide breakfast. | 11 | inform(breakfast=False, write=[7{name=El Mar}]) |

Table 3 gives an example of how slot types may be used: inform(read=[7{dst_city=Punta Cana, category=2.5}]) means that the values 2.5 and "Punta Cana" are to be read from frame 7, and to be written in the current frame. At this turn of the dialogue, the wizard may repeat information from frame 7. The annotation inform(breakfast=False, write=[7{name=El Mar}]) means that the value "False" for breakfast is written in frame 7 and that frame 7 was identified in this utterance by the name of the hotel "El Mar."

In the example dataset, the average number of frames created per dialogue is 6.71 and the average number of frame switches is 3.58. FIG. 2 illustrates an overview of example boxplots for the number of frame creations and the number of frame changes in the Frames corpus.

The example Frames dataset may be used to research many aspects of goal-oriented dialogue, from Natural Language Understanding (NLU) to natural language generation. Three example topics are discussed in greater detail below.

Frame tracking may extend state tracking (Henderson, 2015) to a setting where several semantic frames may be tracked simultaneously. In state tracking, every new slot value overwrites the previous one. In frame tracking, a new value may create a new semantic frame. The frame tracking task may be significantly harder than state tracking, as an active frame may be identified for each utterance, as well as all the frames which may be referenced by the utterance.

At each user turn t, access to at least a part of the dialogue history $H=\{f_1, \ldots, f_{n_{t-1}}\}$ may be assumed, where $f_i$ may be a frame and $n_{t-1}$ may be the number of frames created so far in the dialogue. For a user utterance $u_t$ at time t, the following Natural Language Understanding (NLU) labels may be provided: dialogue acts, slot types, and slot values. As will be appreciated, different labels may be used to describe a user utterance without departing from the spirit of this disclosure. As a result, frame tracking may be used to predict if a new frame is created and may predict, for each dialogue act, the "ref" labels (possibly none) and the ids of the referred frames.

Predicting the frame referred to by a dialogue act may comprise detecting if a new frame is created and/or recognizing a previous frame by the values being mentioned by the user (potentially a synonym, e.g., NYC and New York) or it may comprise using the user utterance directly. The user utterance may be used directly because users may not always use slot values to refer to previous frames. As an example, a user may ask: "Which package has the soonest departure?" In this case, the user may refer to several frames (the packages) without ever explicitly describing which ones. This phenomenon may be quite common for dialogue acts such as "switch_frame" (979 occurrences in the corpus)

and "request_compare" (455 occurrences in the corpus). These cases may be resolved by working on the text directly and resolving anaphora.

Two metrics may be defined: frame identification and frame creation. For frame identification, for each dialogue act, the ground truth pair (key-value, frame) may be compared to the one predicted by the frame tracker. Performance may be computed as the number of correct predictions over the number of pairs. A prediction may be deemed correct if the frame, key, and/or value are the same (e.g., an exactly or approximate match, within a certain threshold, etc.) in the ground truth and in the prediction. The frame may be the id of the referred frame. The key and value may be respectively the type and the value of the slot used to refer to the frame (as said previously, these can be null). It will be appreciated that other metrics or conditions may be used to determine whether a prediction is correct. Frame creation may be computed as the number of times the frame tracker predicts that a frame is created over the number of dialogue turns.

One aspect of this dataset is that memory may not only be a matter of frame tracking. In an example, a wizard may speak about a current frame to ask or answer questions most of the time. However, in another example, the wizard may talk about previous frames, which may be interpreted as appealing to memories in a conversation. In order to reproduce this kind of behavior, a dialogue manager may identify potentially relevant frames for the current turn and may output one or more actions for these frames. While it may be challenging when using reinforcement learning, a wizard may perform more than one action per turn in some examples, such that a dialogue manager may output several actions in one dialogue turn.

An interesting behavior that was observed in the dataset is that wizards may tend to summarize database results. An example is a wizard saying: "The cheapest available flight is 1947.14USD." In this case, the wizard may inform the user that the database has no cheaper result than the one she is proposing. In examples, to imitate this behavior, a natural language generator may reason over the database and decide how to present the results to the user.

The Frames dialogues may be provided in JSON format. While the following description provides example fields, titles, and content for storing dialog information, it will be appreciated that such information may be stored using a variety of formats, fields, and techniques without departing from the spirit of this disclosure. In an example, each dialogue may have five main fields: "turns," "labels," "user_id," "wizard_id," and "id." The ids may be unique for each dialogue ("id"), each user ("user_id"), and/or each wizard ("wizard_id"). The "labels" may be "userSurveyRating" and "wizardSurveyTaskSuccessful". They may be respectively the user rating and the wizard's perceived task completion, as was discussed above. The "turns" may have the following fields:

"author" may be "user" or "wizard".

"text" may be the author's utterance.

"labels" may be the id of the currently active frame ("active_frame") as well as a list of dialogue acts ("acts") each with a "name," and "args" (key-value pairs), and a list of dialogue acts without "ref" tags ("acts_without_refs") for frame tracking.

"timestamp" may be a timestamp for the message.

"db" (wizard turns only) may be a list of search queries made by the wizard with the associated search results/suggestions.

"frames" may be a list of all the frames up to the current turn. Each frame may have the following labels:

"frame_id" may be the id of the frame.

"frame_parent_id" may be the id of the parent frame.

"requests," "binary_questions," "compare_requests" may be user questions.

"info" properties of the frame (e.g., user constraints or information provided by the wizard).

Figure 3:
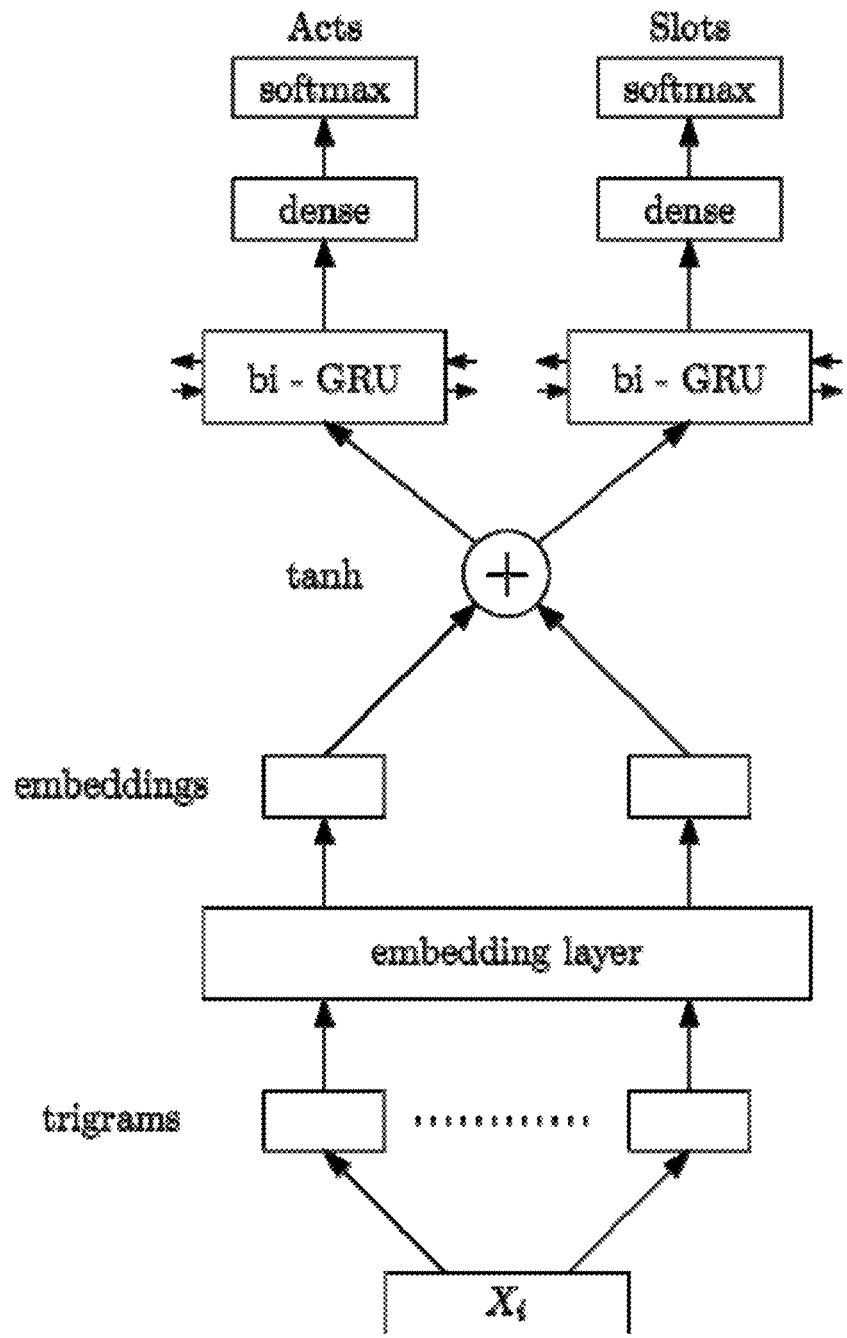
FIG. 3 illustrates an overview of an example natural language understanding model for slots and acts prediction.

FIG. 3 illustrates an overview of an example NLU model for slots and acts prediction. In an example, the NLU model may take input word $X_i$ and output labels for slots and acts. The model may split into slots-specific and acts-specific predictors after the word embedding layer (which may compute a non-linearity on top of the per-word sum of character trigram embeddings). Convolutional layers may compute n-gram outputs for values of n of either 1, 2, or 3, and the predictors may output labels for each n-gram. In another example, multiple word embedding layers may be used (e.g., for different predictors, for different contexts, etc.).

The NLU task may comprise dialogue act prediction and IOB (Inside, Outside, Beginning) tagging. In an example, the IOB tagging part may operate on character trigrams and may be based on a robust named entity recognition model. For each word of the utterance, a pair of tags may be predicted—one for the act and one for the slot. The model may split into two parts: one part may be trained to predict dialogue acts and the other part may be trained to predict slot types (at this stage, either a slot type or an O tag may be predicted). These two parts may share an embedding matrix for the input character trigrams. As will be appreciated, IOB tagging may be performed using other techniques. For example, a single model may be trained to predict dialogue acts and slot types, rather than having two parts to perform the prediction analysis. In another example, bigrams may be used instead of trigrams, or any other type of natural language processing technique may be used to predict a dialogue act and/or a slot.

In some examples, the two parts of the model may be trained simultaneously, using a modified categorical cross-sentropy loss for either set of outputs. The loss may ignore O labels that are already predicted correctly by the model, because O labels may be far more frequent than other labels. Not limiting their contribution to the loss may cause the model to get predict O labels for every word. The loss for the two parts of the model may be added together, and the combined objective may be optimized using the ADAM optimizer. In other examples, each part of the model may be trained separately, or, as discussed above, one single model may be used.

A rule-based frame tracker may take as input the "acts_without_refs" tags and, according to hand-designed rules, may predict the "ref" tags and the frame creations. In an example, one or more of the following rules may be used:

Create a new frame: if the user informs the wizard of a new constraint for a slot that is already set in the current frame.

Assign ref to a previous frame: if the NLU model predicts a dialogue act that can have a ref tag.

Stay in the current frame: if none of the above holds.

If the NLU model predicts a dialogue act that can have a ref tag with a slot type and a slot value (e.g., dst_city=Los Angeles), the rule-based frame tracker may evaluate the list of frames and assign the ref to the first frame with the same slot value. If there is no match, the frame tracker may switch to the latest created frame.

Figure 4:
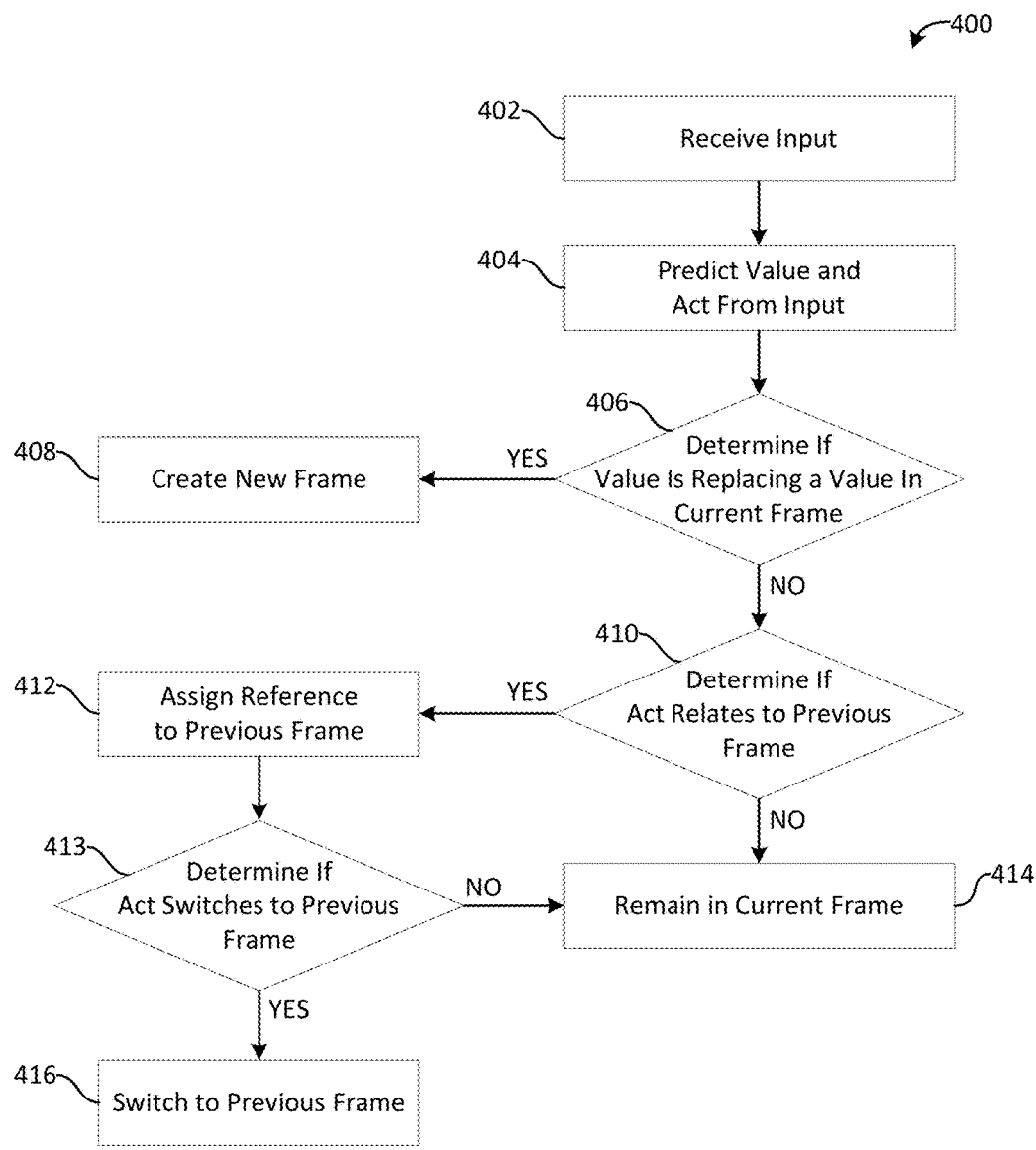
FIG. 4 illustrates an overview of an example method for performing frame tracking in accordance with aspects disclosed herein.

FIG. 4 illustrates an overview of an example method 400 for performing frame tracking in accordance with aspects disclosed herein. Method 400 may be performed by one or more computing devices, including, but not limited to, a personal computer, a laptop computer, a tablet computer, a mobile computing device, or a distributed computing device. Method 400 begins at operation 402, where an input may be received. The input may comprise dialogue data relating to a conversation between a user and a dialogue agent, according to aspects disclosed herein.

At operation 404, an act and a value may be predicted from the input. The prediction may be performed using NLU in order to evaluate the input data, as was discussed above in greater detail with respect to FIG. 3. In an example, the act and value may relate to a parameter for which the dialogue agent prompted the user. In some examples, more than one act and/or more than one value may be received. In another example, the act and value may relate to information that was previously discussed in the conversation, or may relate to a new topic or line of conversation.

Moving to decision operation 406, a determination may be made whether the predicted value from operation 404 is replacing a value already present in the current frame of the conversation. This determination may comprise evaluating a slot associated with the predicted value to determine whether the value was provided to overwrite the preexisting value of the associated slot. In some examples, the received input may relate to multiple acts, slots, and/or predicted values. In such examples, the determination may comprise evaluating each of the slots to determine whether the associated predicted values overwrite any of the preexisting values. If it is determined that a value is replacing a preexisting value, flow branches "YES" to operation 408, where a new frame may be created. Creating a new frame may comprise generating a new frame, creating a copy of the most recent frame, or copying parts of the information contained within the most recent frame to a new frame, or any combination thereof. Flow terminates at operation 408.

If, however, it is determined that there is not a value replacement, flow branches "NO" to decision operation 410 where it is determined whether the act relates to a previous frame of the conversation. This determination may comprise evaluating the predicted act, the predicted value, a slot associated with the predicted value, or whether the input contains anaphora, among other factors. If it is determined that the act relates to a previous frame, flow branches "YES" to operation 412, where a reference is assigned to a previous frame. Assigning the reference may comprise determining which previous frame was the earliest frame to which the act relates, or evaluating one of multiple frames to which the act relates. In an example, the reference may refer to multiple frames of the conversation. In another example, information may be retrieved as a result of assigning the reference, such as information relating to the predicted act, the predicted value, or a combination thereof.

Flow then progresses to decision operation 413, where it is determined whether the act switches to the previous frame. In an example, the determination may comprise evaluating whether the input refers to the previous frame with respect to the current frame (e.g., a comparison) or whether the input more directly relates to the previous frame (e.g., a request for additional information relating to values from a previous frame). In some examples, the determination may comprise determining that the input solely mentions slot values of the previous frame. In other examples, the determination may comprise determining that the user has requested that the dialogue agent change the frame of the conversation. It will be appreciated that other techniques may be used to determine whether the act switches to the previous frame without departing from the spirit of this disclosure.

If it is determined at decision operation 413 that the act switches to the previous frame, flow branches "YES" to operation 416, where the dialogue agent may switch to the previous frame. Flow terminates at operation 416. By contrast, if it is determined that the act does not switch to the previous frame, flow instead branches "NO" to operation 414, which will be discussed in further detail below.

Returning to decision operation 410, if, however, it is determined that the act does not relate to a previous frame, flow instead branches "NO" to operation 414, where the current frame is maintained. In an example, other information from the current frame may be evaluated or accessed as a result of remaining in the current frame. In another example, while the same frame is maintained, information within the frame may be updated or altered based on the predicted act, predicted value, a slot associated with the predicted value, or other information within the received input. Flow terminates at operation 414.

A baseline was compared to random performance. For random performance, for each dialogue act and slot type, priors were computed on the corpus for each time the user would refer to the current frame vs. to a previous one. Priors were also computed for the slot types used to refer to a frame. Frames and slot types were sampled based on these priors.

TABLE 4

Performance of the Frame Tracking Baselines (mean and standard deviation).

|  | Rule-Based | Random |
| --- | --- | --- |
| Frame Creation | 0.487 ± 0.03 | 0.474 ± 0.02 |
| Frame Identification | 0.238 ± 0.02 | 0.181 ± 0.02 |

Table 4 presents results for these baselines. The mean and standard deviation for frame identification and frame creation over 10 runs is reported. The models (as well as the NLU model) were tested by performing leave-one-user-out testing. There were a total of 11 participants in the user role during data collection. Two participants performed significantly fewer dialogues than the others. The dialogues generated by these two participants (ids U21E41CQP and U23KPC9QV) were merged. For each of the resulting 10 users, nine others were split into training (80%) and validation (20%) users, and tested on the dialogues from the held-out user.

Table 4 shows an example wherein the baseline model performs only slightly better than random on each subtask. Thus, such results suggest that simple rules are far from adequate for frame tracking.

The Frames dataset was introduced as a corpus of human-human dialogues in a travel domain. The dataset was proposed to study memory in goal-oriented dialogue systems. Aspects relating to the frame tracking task were formalized, which requires simultaneously tracking several semantic frames during the dialogue. A rule-based baseline for this task was proposed, and it was shown that rules may only slightly out-perform a random baseline.

TABLE 5

Searchable fields in the database of packages

| Field | Description |
|---|---|
| PRICE_MAX | Maximum price the user is willing to pay |
| PRICE_MIN | Minimum price defined by the user |
| DESTINATION_CITY | Destination city |
| MAX_DURATION | Maximum number of days for the trip |
| NUM_ADULTS | Number of adults |
| NUM_CHILDREN | Number of children |
| START_DATE | Start date for the trip |
| END_DATE | End date for the trip |
| ARE_DATES_FLEXIBLE | Boolean value indicating whether or not the user's dates are flexible. If True, then the search is broadened to 2 days before START_DATE and 2 days after END_DATE. |
| ORIGIN_CITY | Origin city |

TABLE 6

Non-searchable fields in the database of packages

| Field | Description |
|---|---|
| Global Properties | |
| PRICE | Price of the trip including flights and hotel |
| DURATION | Duration of the trip |
| Hotel Properties | |
| NAME | Name of the hotel |
| COUNTRY | Country where the hotel is located |
| CATEGORY | Rating of the hotel (in number of stars) |
| CITY | City where the hotel is located |
| GUEST_RATING | Rating of the hotel by guests (in number of stars) |
| BREAKFAST, PARKING, WIFI, GYM, SPA | Boolean value indicating whether or not the hotel offers this amenity. |
| PARK, MUSEUM, BEACH, SHOPPING, MARKET, AIRPORT, UNIVERSITY, MALL, CATHEDRAL, DOWNTOWN, PALACE, THEATRE | Boolean value indicating whether or not the hotel is in the vicinity of one of these. |
| Flights Properties | |
| SEAT | Seat type (economy or business) |
| DEPARTURE_DATE_DEP | Date of departure to destination |
| DEPARTURE_DATE_ARR | Date of return flight |
| DEPARTURE_TIME_DEP | Time of departure to destination |
| ARRIVAL_TIME_DEP | Time of arrival to destination |
| DEPARTURE_TIME_ARR | Time of departure from destination |
| ARRIVAL_TIME_ARR | Time of arrival to origin city |
| DURATION_DEP | Duration of flight to destination |
| DURATION_ARR | Duration of return flight |

TABLE 7

List of dialogue acts in the annotation of Frames

| Dialogue Act | Speaker | Description |
|---|---|---|
| inform | User/Wizard | Inform a slot value |
| offer | Wizard | Offer a package to the user |
| request | User/Wizard | Ask for the value of a particular slot |
| switch_frame | User | Switch to a frame |
| suggest | Wizard | Suggest a slot value or package that does not match the user's constraints |
| no_result | Wizard | Tell the user that the database returned no results |
| thankyou | User/Wizard | Thank the other speaker |
| sorry | Wizard | Apologize to the user |
| greeting | User/Wizard | Greet the other speaker |
| affirm | User/Wizard | Affirm something said by the other speaker |
| negate | User/Wizard | Negate something said by the other speaker |
| confirm | User/Wizard | Ask the other speaker to confirm a given slot value |
| moreinfo | User | Ask for more information on a given set of results |
| goodbye | User/Wizard | Say goodbye to the other speaker |
| request_alts | User | Ask for other possibilities |
| request_compare | User | Ask the wizard to compare packages |
| hearmore | Wizard | Ask if user would like to hear more about a given package |
| you_are_welcome | Wizard | Tell the user she is welcome |
| canthelp | Wizard | Tell the user you cannot answer her request |
| reject | Wizard | Tell the user you did not understand what she mean |

TABLE 8

List of slot types not present in the database

| Slot Type | Description |
|---|---|
| count | Number of different packages |
| count_amenities | Number of amenities |
| count_name | Number of different hotels |
| count_dst_city | Number of destination cities |
| count_seat | Number of seat options (for flights) |
| count_category | Number of star ratings |
| id | Id of the frame created (for offers and suggestions) |
| vicinity | Vicinity of the hotel |
| amenities | Amenities of the hotel |
| ref_anaphora | Words used to refer to a frame e.g., "the second package" |
| impl_anaphora | Used when a slot type is not specifically mentioned e.g., "What is the price for Rio?" . . . "And for Cleveland?" |
| ref | Id of the frame that the speaker is referring to |
| read | Reads slot values specified in another frame and writes them in the current frame |
| write | Writes slot values in a given frame |

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
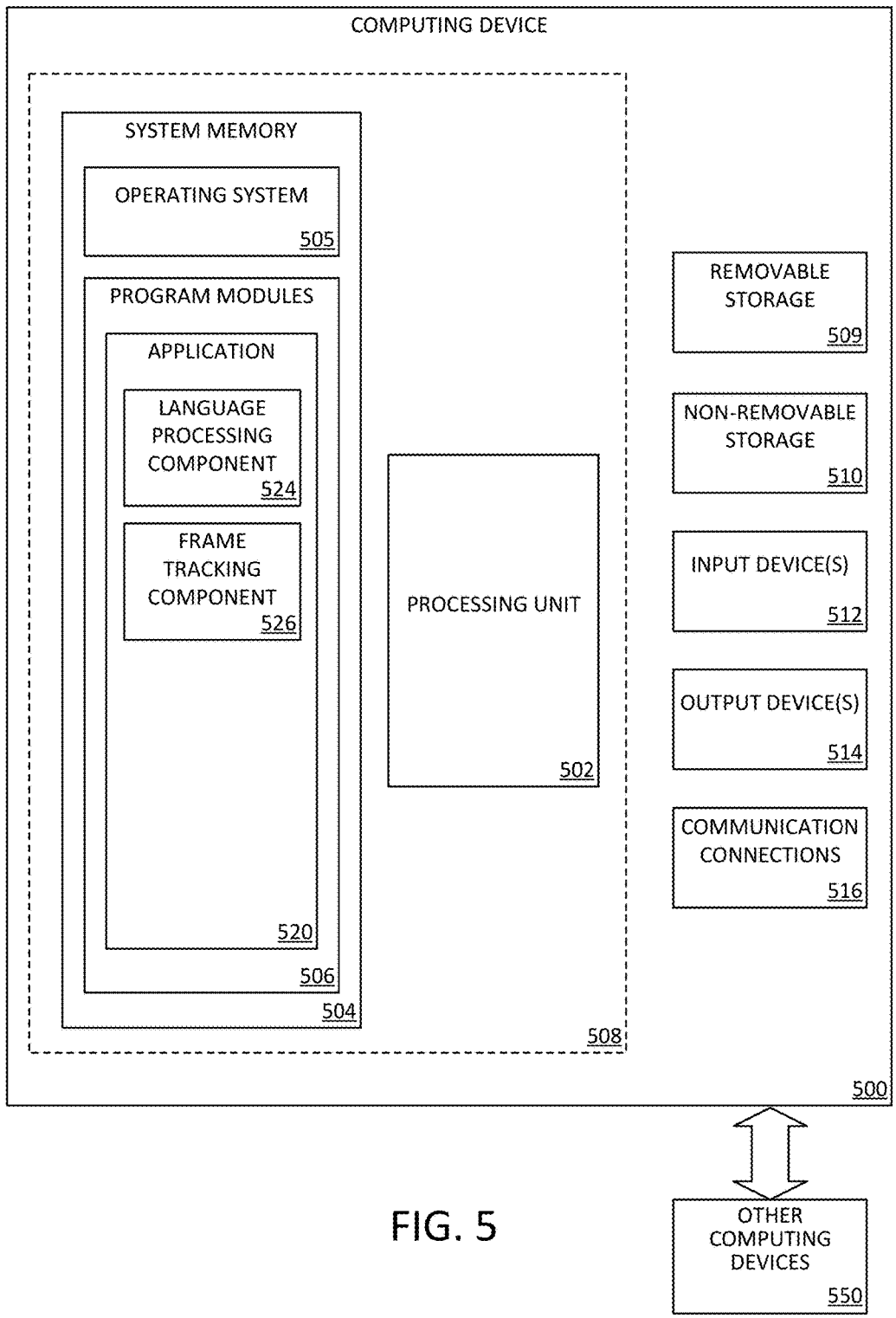
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for performing the various aspects disclosed herein such as language processing component 524 and frame tracking component 526. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
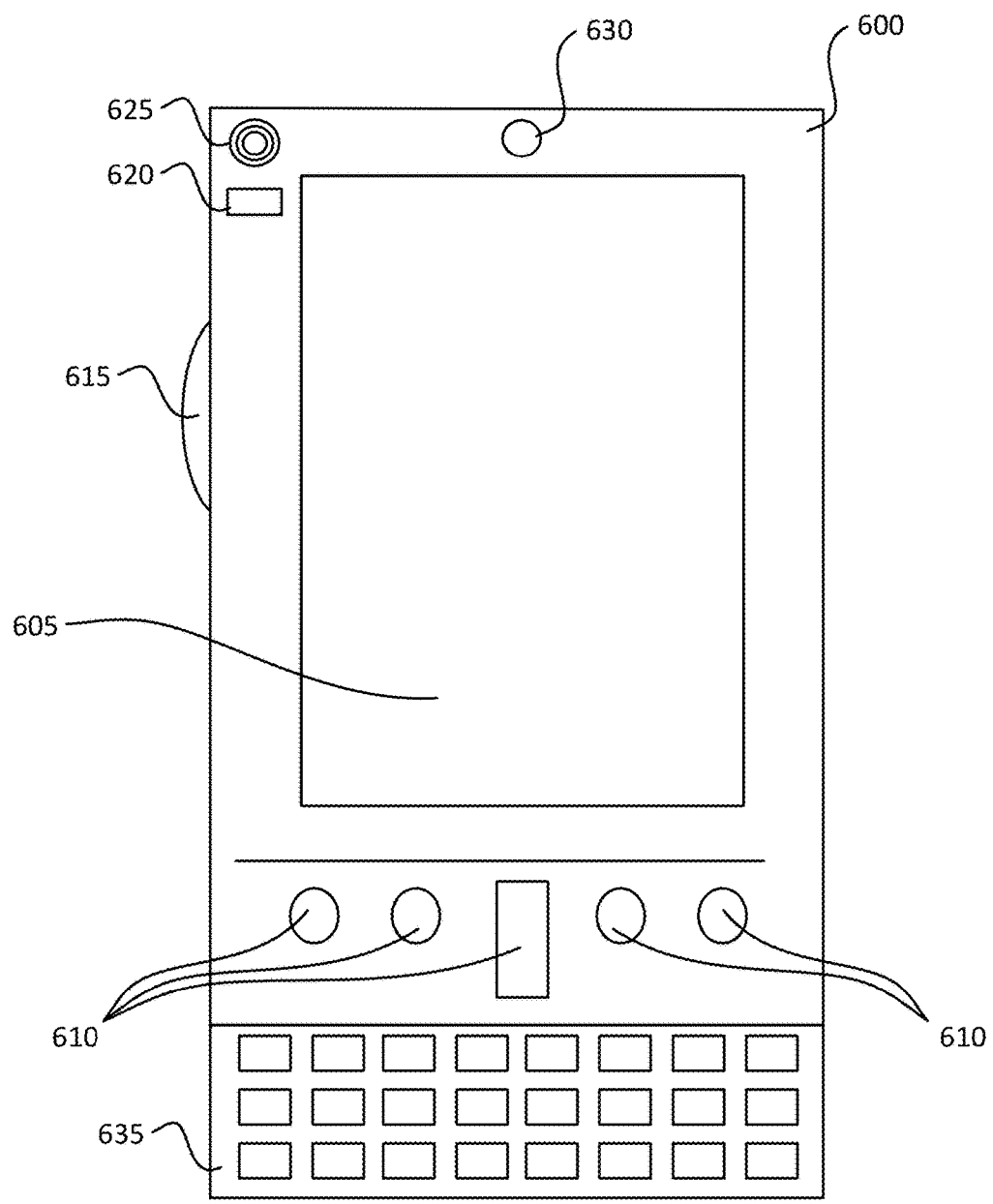
FIGS. 6A and 6B are simplified block diagrams of a mobile computing device with which aspects of the present disclosure may be practiced.
Figure 6B:
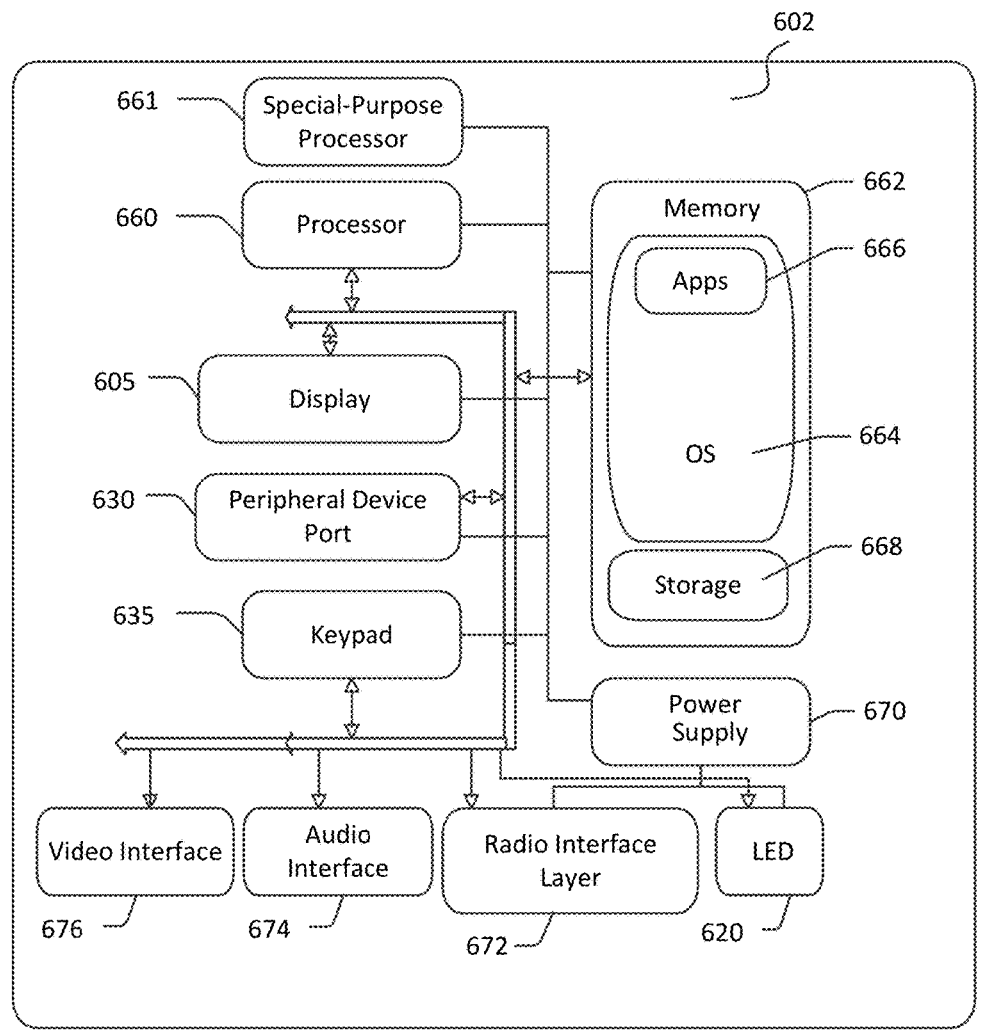

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
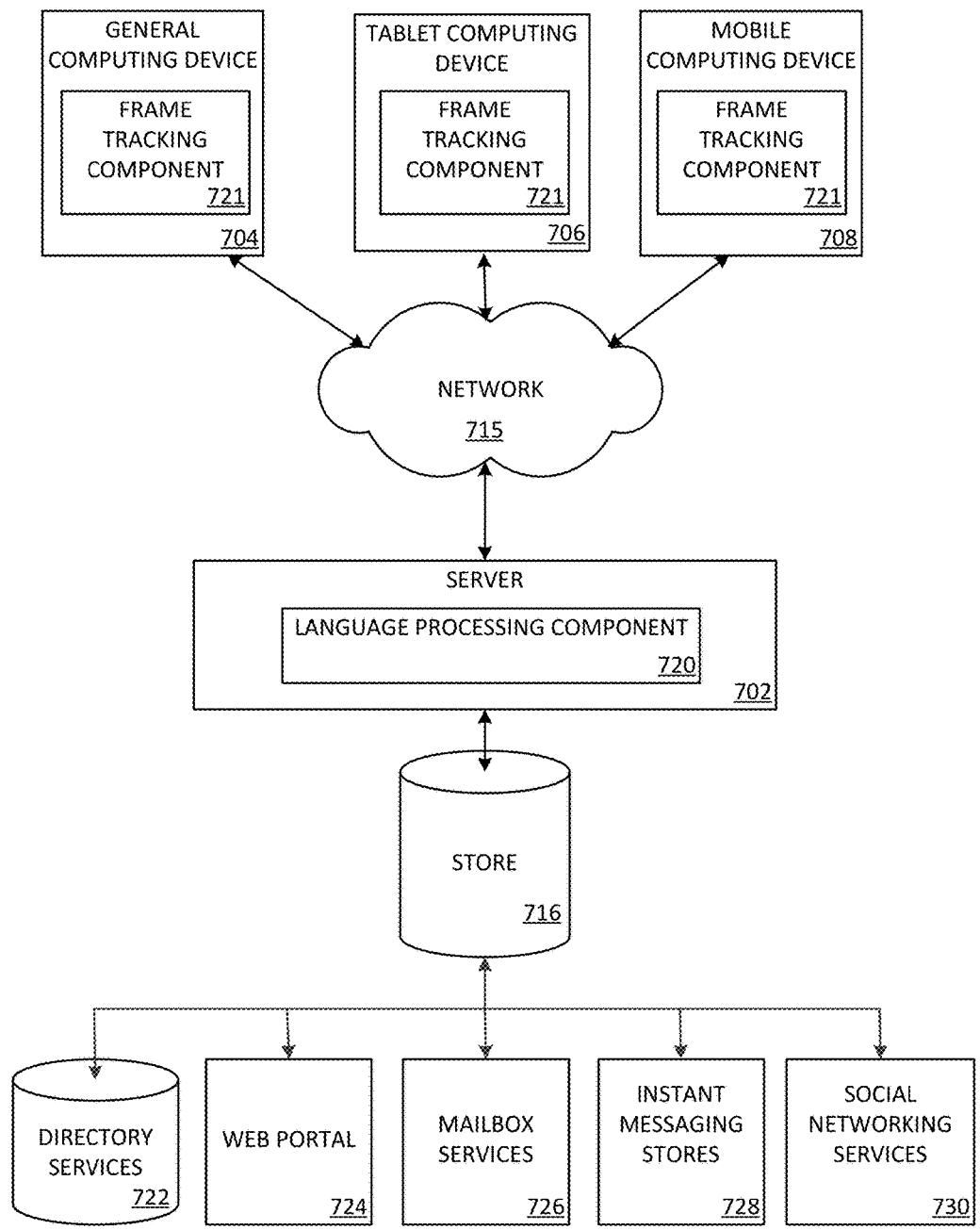
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. Frame tracking component 721 may be employed by a client that communicates with server device 702, and/or language processing component 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
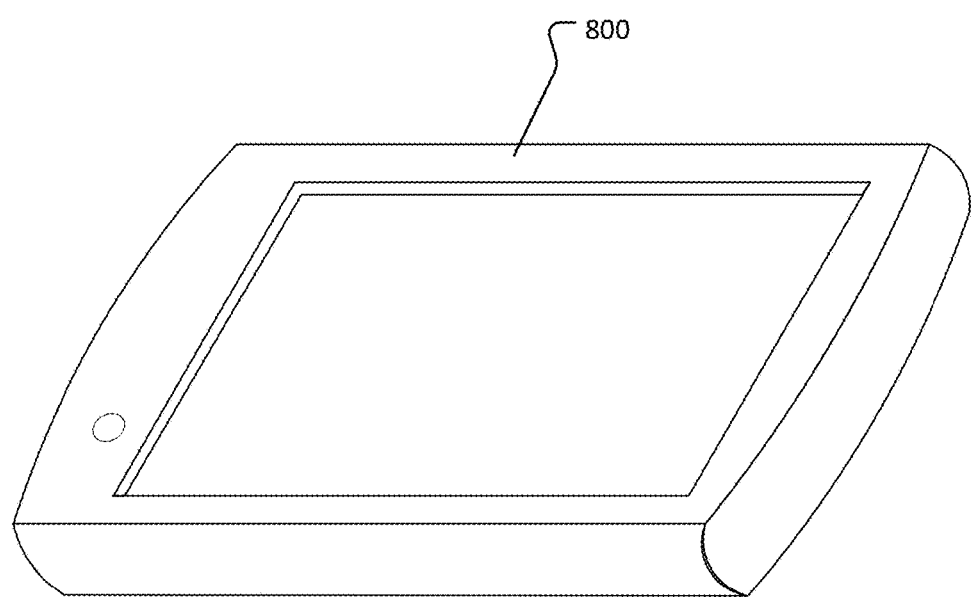
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The set of operations comprises: receiving an input utterance of a current frame of a conversation; generating, using natural language understanding, a predicted value and a predicted act for the input utterance; determining whether the predicted value is a new value for a slot having a pre-existing value in the current frame; when it is determined that the predicted value is a new value having a pre-existing value in the current frame, creating a new frame of the conversation; determining whether the predicted act relates to a previous frame of the conversation; when it is determined that the predicted act relates to a previous frame, generating an association between the current frame and the previous frame of the conversation; determining whether the predicted act switches to the previous frame of the conversation; and when it is determined that the predicted act switches to the previous frame of the conversation, switching to the previous frame of the conversation. In an example, determining whether the predicted act relates to a previous frame of the conversation comprises determining that the predicted act relates to a plurality of previous frames of the conversation, and wherein generating the association comprises generating an association with each of the plurality of previous frames. In another example, determining whether the predicted value is a new value comprises using a model trained to predict slot types. In a further example, determining whether the predicted act relates to a previous frame comprises using a model trained to predict dialogue acts. In yet another example, the set of operations further comprises: when it is determined that the predicted value is not a new value, continuing the conversation based on the current frame of the conversation. In a further still example, the set of operations further comprises: when it is determined that the predicted act does not switch to the previous frame of the conversation, continuing the conversation based on the current frame of the conversation. In another example, the input utterance is part of a text-based dialogue.

In another aspect, the technology relates to a method for dialogue state management. The method comprises: receiving, from a computing device, an input utterance of a current frame of a conversation; generating, using natural language understanding, a predicted value and a predicted act for the input utterance; determining, using a first model trained to predict slot types, whether the predicted value is a new value for a slot having a pre-existing value in the current frame; based on determining that the predicted value is a new value, creating a new frame of the conversation; determining, using a second model trained to predict dialogue acts, whether the predicted act relates to a previous frame of the conversation; based on determining that the predicted act relates to a previous frame, generating an association between the current frame and the previous frame of the conversation; determining whether the predicted act switches to the previous frame of the conversation; based on determining that the predicted act switches to the previous frame of the conversation, switching to the previous frame of the conversation; generating, based on the predicted value and the predicted act, a response to the received input utterance; and providing the generated response to the computing device. In an example, determining whether the predicted act relates to a previous frame of the conversation comprises determining that the predicted act relates to a plurality of previous frames of the conversation, and wherein generating the association comprises generating an association with each of the plurality of previous frames. In another example, the method further comprises: based on determining that the predicted value is not a new value, continuing the conversation based on the current frame of the conversation. In a further example, the method further comprises: based on determining that the predicted act does not switch to the previous frame of the conversation, continuing the conversation based on the current frame of the conversation. In yet another example, the first model and the second model are subparts of the same model. In a further still example, the input utterance is part of a text-based dialogue.

In a further aspect, the technology relates to another method for dialogue state management. The method comprises: receiving an input utterance of a current frame of a conversation; generating, using natural language understanding, a predicted value and a predicted act for the input utterance; determining whether the predicted value is a new value for a slot having a pre-existing value in the current frame; based on determining that the predicted value is a new value, creating a new frame of the conversation; determining whether the predicted act relates to a previous frame of the conversation; based on determining that the predicted act relates to a previous frame, generating an association between the current frame and the previous frame of the conversation; determining whether the predicted act switches to the previous frame of the conversation; and when it is determined that the predicted act switches to the previous frame of the conversation, switching to the previous frame of the conversation. In an example, determining whether the predicted act relates to a previous frame of the conversation comprises determining that the predicted act relates to a plurality of previous frames of the conversation, and wherein generating the association comprises generating an association with each of the plurality of previous frames. In another example, determining whether the predicted value is a new value comprises using a model trained to predict slot types. In a further example, determining whether the predicted act relates to a previous frame comprises using a model trained to predict dialogue acts. In yet another example, the method further comprises: based on determining that the predicted value is not a new value, continuing the conversation based on the current frame of the conversation. In a further still example, the method comprises: based on determining that the predicted act does not switch to the previous frame of the conversation, continuing the conversation based on the current frame of the conversation. In another example, the input utterance is part of a text-based dialogue.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory storing instructions that when executed by the at least one processor perform a set of operations comprising:
     receiving an input utterance of a current frame of a conversation;
     generating, using natural language understanding, a predicted value and a predicted act for the input utterance;
     determining, using a first model trained to predict slot types, whether the predicted value is a new value for a slot having a pre-existing value in the current frame;
     when it is determined that the predicted value is a new value having a pre-existing value in the current frame, creating a new frame of the conversation;
     determining, using a second model trained to predict dialogue acts, whether the predicted act relates to a previous frame of the conversation;
     when it is determined that the predicted act relates to a previous frame, generating an association between the current frame and the previous frame of the conversation;
     determining whether the predicted act switches to the previous frame of the conversation; and
     when it is determined that the predicted act switches to the previous frame of the conversation, switching to the previous frame of the conversation;
   wherein at least two frames, selected from the group consisting of the new frame, the current frame, and the previous frame, are retained in memory, thereby tracking multiple states of the conversation simultaneously.

2. The system of claim 1, wherein determining whether the predicted act relates to a previous frame of the conversation comprises determining that the predicted act relates to a plurality of previous frames of the conversation, and wherein generating the association comprises generating an association with each of the plurality of previous frames.

3. The system of claim 1, wherein the first model and the second model are each a subpart of a third model.

4. The system of claim 1, wherein the input utterance is received as part of an oral dialogue.

5. The system of claim 1, wherein the set of operations further comprises:
   when it is determined that the predicted value is not a new value, continuing the conversation based on the current frame of the conversation.

6. The system of claim 1, wherein the set of operations further comprises:
   when it is determined that the predicted act does not switch to the previous frame of the conversation, continuing the conversation based on the current frame of the conversation.

7. The system of claim 1, wherein the input utterance is part of a text-based dialogue.

8. A method for dialogue state management, comprising:
   receiving, from a computing device, an input utterance of a current frame of a conversation;
   generating, using natural language understanding, a predicted value and a predicted act for the input utterance;
   determining, using a first model trained to predict slot types, whether the predicted value is a new value for a slot having a pre-existing value in the current frame;
   based on determining that the predicted value is a new value, creating a new frame of the conversation;
   determining, using a second model trained to predict dialogue acts, whether the predicted act relates to a previous frame of the conversation;
   based on determining that the predicted act relates to a previous frame, generating an association between the current frame and the previous frame of the conversation;
   determining whether the predicted act switches to the previous frame of the conversation;
   based on determining that the predicted act switches to the previous frame of the conversation, switching to the previous frame of the conversation;
   retaining at least two frames in memory, selected from the group consisting of the new frame, the current frame, and the previous frame, thereby tracking multiple states of the conversation simultaneously;
   generating, based on the predicted value and the predicted act, a response to the received input utterance; and
   providing the generated response to the computing device.

9. The method of claim 8, wherein determining whether the predicted act relates to a previous frame of the conversation comprises determining that the predicted act relates to a plurality of previous frames of the conversation, and wherein generating the association comprises generating an association with each of the plurality of previous frames.

10. The method of claim 8, further comprising:
    based on determining that the predicted value is not a new value, continuing the conversation based on the current frame of the conversation.

11. The method of claim 8, further comprising:
    based on determining that the predicted act does not switch to the previous frame of the conversation, continuing the conversation based on the current frame of the conversation.

12. The method of claim 8, wherein the first model and the second model are subparts of the same model.

13. The method of claim 8, wherein the input utterance is part of a text-based dialogue.

14. A method for dialogue state management, comprising:
    receiving an input utterance of a current frame of a conversation;
    generating, using natural language understanding, a predicted value and a predicted act for the input utterance;

determining, using a first model trained to predict slot types, whether the predicted value is a new value for a slot having a pre-existing value in the current frame;

based on determining that the predicted value is a new value, creating a new frame of the conversation;

determining, using a second model trained to predict dialogue acts, whether the predicted act relates to a previous frame of the conversation;

based on determining that the predicted act relates to a previous frame, generating an association between the current frame and the previous frame of the conversation determining whether the predicted act switches to the previous frame of the conversation; and when it is determined that the predicted act switches to the previous frame of the conversation, switching to the previous frame of the conversation, wherein at least two frames, selected from the group consisting of the new frame, the current frame, and the previous frame, are retained in memory, thereby tracking multiple states of the conversation simultaneously.

15. The method of claim 14, wherein determining whether the predicted act relates to a previous frame of the conversation comprises determining that the predicted act relates to a plurality of previous frames of the conversation, and wherein generating the association comprises generating an association with each of the plurality of previous frames.

16. The method of claim 14, wherein the first model and the second model are each part of the same model.

17. The method of claim 14, wherein the input utterance is received as part of an oral dialogue.

18. The method of claim 14, further comprising:
based on determining that the predicted value is not a new value, continuing the conversation based on the current frame of the conversation.

19. The method of claim 14 further comprising:
based on determining that the predicted act does not switch to the previous frame of the conversation, continuing the conversation based on the current frame of the conversation.

20. The method of claim 14, wherein the input utterance is part of a text-based dialogue.

* * * * *